(12) United States Patent  
Nogami et al.

(10) Patent No.: US 10,038,192 B2
(45) Date of Patent: Jul. 31, 2018

(54) SOLID-STATE BATTERY

(71) Applicants: MITSUBISHI GAS CHEMICAL COMPANY, INC., Tokyo (JP); TOHOKU TECHNO ARCH CO., LTD., Miyagi (JP)

(72) Inventors: Genki Nogami, Niigata (JP); Mitsugu Taniguchi, Niigata (JP); Atsushi Unemoto, Miyagi (JP); Motoaki Matsuo, Miyagi (JP); Shinichi Orimo, Miyagi (JP)

(73) Assignees: MITSUBISHI GAS CHEMICAL COMPANY, INC., Tokyo (JP); TOHOKU TECHNO ARCH CO., LTD., Miyagi (JP)

( * ) Notice: Subject to any disclaimer, the term of this patent is extended or adjusted under 35 U.S.C. 154(b) by 0 days.

(21) Appl. No.: 14/913,172

(22) PCT Filed: Aug. 27, 2014

(86) PCT No.: PCT/JP2014/072438
§ 371 (c)(1),
(2) Date: Feb. 19, 2016

(87) PCT Pub. No.: WO2015/030052
PCT Pub. Date: Mar. 5, 2015

(65) Prior Publication Data
US 2016/0204467 A1    Jul. 14, 2016

(30) Foreign Application Priority Data
Sep. 2, 2013 (JP) .................. 2013-181577

(51) Int. Cl.
*H01M 4/62* (2006.01)
*H01M 4/131* (2010.01)
(Continued)

(52) U.S. Cl.
CPC .............. *H01M 4/62* (2013.01); *H01B 1/122* (2013.01); *H01M 4/131* (2013.01); *H01M 4/133* (2013.01);
(Continued)

(58) Field of Classification Search
CPC ........ H01M 4/62; H01M 4/131; H01M 4/133; H01M 4/134; H01M 10/0525;
(Continued)

(56) References Cited

U.S. PATENT DOCUMENTS

2006/0292449 A1   12/2006 Ota
2011/0117440 A1   5/2011 Maekawa et al.
(Continued)

FOREIGN PATENT DOCUMENTS

JP    2000-223156    8/2000
JP    3149524        1/2001
(Continued)

OTHER PUBLICATIONS

Akihiro Yamauchi et al., "Ko Lithium Ion Dendosei Li2S-P2S5-LiBH4-kei Glass Ceramics no Sakusei to Hyoka, 38th", The Symposium on Solid State Ionics Society in Japan Koen Yokoshu, 2012, pp. 190-191.

(Continued)

*Primary Examiner* — Jane Rhee
(74) *Attorney, Agent, or Firm* — Greenblum & Bernstein, P.L.C.

(57) ABSTRACT

One embodiment provides a solid-state battery that has a positive-electrode layer, a negative-electrode layer, and a lithium-ion-conducting solid electrolyte layer disposed between the positive-electrode layer and the negative-electrode layer. The positive-electrode layer and/or the solid electrolyte layer contains a sulfide solid electrolyte, the negative-electrode layer and/or the solid electrolyte layer (Continued)

contains a solid electrolyte comprising a hydride of a complex, and at least part of the sulfide solid electrolyte is in contact with at least part of the solid electrolyte comprising a hydride of a complex.

6 Claims, 2 Drawing Sheets

(51) Int. Cl.
*H01M 4/133* (2010.01)
*H01M 4/134* (2010.01)
*H01M 10/0525* (2010.01)
*H01M 10/0562* (2010.01)
*H01M 10/052* (2010.01)
*H01B 1/12* (2006.01)
*H01M 4/02* (2006.01)

(52) U.S. Cl.
CPC ......... *H01M 4/134* (2013.01); *H01M 10/052* (2013.01); *H01M 10/0525* (2013.01); *H01M 10/0562* (2013.01); *H01M 2004/027* (2013.01); *H01M 2004/028* (2013.01); *H01M 2220/10* (2013.01); *H01M 2220/20* (2013.01); *H01M 2220/30* (2013.01); *Y02T 10/7011* (2013.01)

(58) Field of Classification Search
CPC ........... H01M 10/0562; H01M 10/052; H01M 2004/027028; H01M 2220/10; H01M 2220/20; H01M 2220/30
See application file for complete search history.

(56) References Cited

U.S. PATENT DOCUMENTS

| | | | | |
|---|---|---|---|---|
| 2012/0052382 | A1* | 3/2012 | Yoshida | H01M 4/043 429/211 |
| 2012/0251871 | A1 | 10/2012 | Suzuki et al. | |
| 2012/0301778 | A1 | 11/2012 | Trevey et al. | |
| 2013/0040208 | A1 | 2/2013 | Kanno et al. | |
| 2013/0295464 | A1* | 11/2013 | Yanagi | H01M 4/5815 429/231.9 |

FOREIGN PATENT DOCUMENTS

| | | |
|---|---|---|
| JP | 3163741 | 3/2001 |
| JP | 3343934 | 8/2002 |
| JP | 2003-68361 | 3/2003 |
| JP | 2006-277997 | 10/2006 |
| JP | 4165536 | 8/2008 |
| JP | 2011-150942 | 8/2011 |
| JP | 2012-43646 | 3/2012 |
| JP | 2012-209104 | 10/2012 |
| JP | 2012-209106 | 10/2012 |
| JP | 5187703 | 4/2013 |
| JP | 2014-120432 | 6/2014 |
| JP | 2014-160572 | 9/2014 |
| WO | 2009/139382 | 11/2009 |
| WO | 2011/118801 | 9/2011 |

OTHER PUBLICATIONS

"SEI Technical Review, vol. 167", , Sep. 2005, pp. 54-60.
"Applied Physics Letters, 91", , 2007, pp. 224103.
"Journal of the American Chemical Society, 131", , 2009, pp. 894-895.
"Journal of Power Sources, 226", ,2013, pp. 61-64.
International Search Report issued in PCT/JP2014/072438, dated Oct. 7, 2014.
Yamauchi et al., "Preparation and Ionic Conductivities of (100-x) (0.75Li$_2$S.0.25P$_2$S$_5$) x LiBH$_4$ Glass Electrolytes"; Journal of Power Sources, vol. 244; Dec. 10, 2012; pp. 707-710.
Takashi et al., "All Solid Battery Using Hybride Based Solid Electrolyte: Determination on TiS$_2$ Cathode"; Collected Abstracts of Meeting of the Japan Institute of Metals, vol. 150; Jan. 1, 2012; pp. 373.
Extended European Search Report issued in Patent Application No. 14839205.3, dated Mar. 30, 2017.

* cited by examiner

[Figure 1]
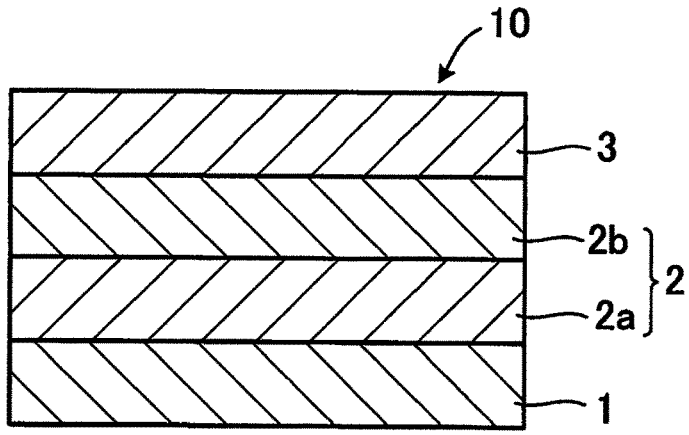
[Figure 2]
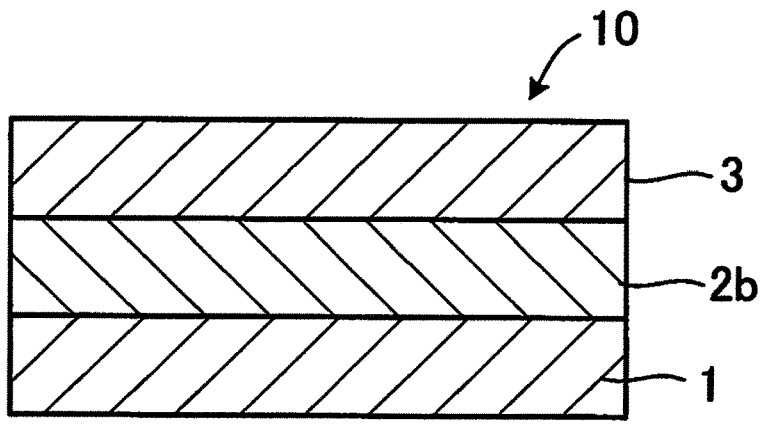
[Figure 3]
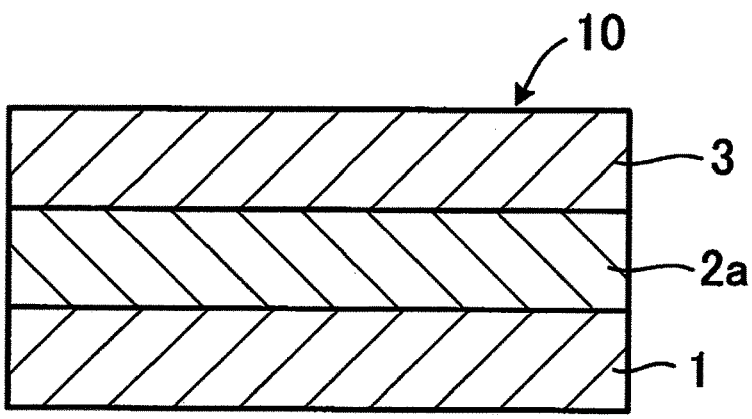

[Figure 4]
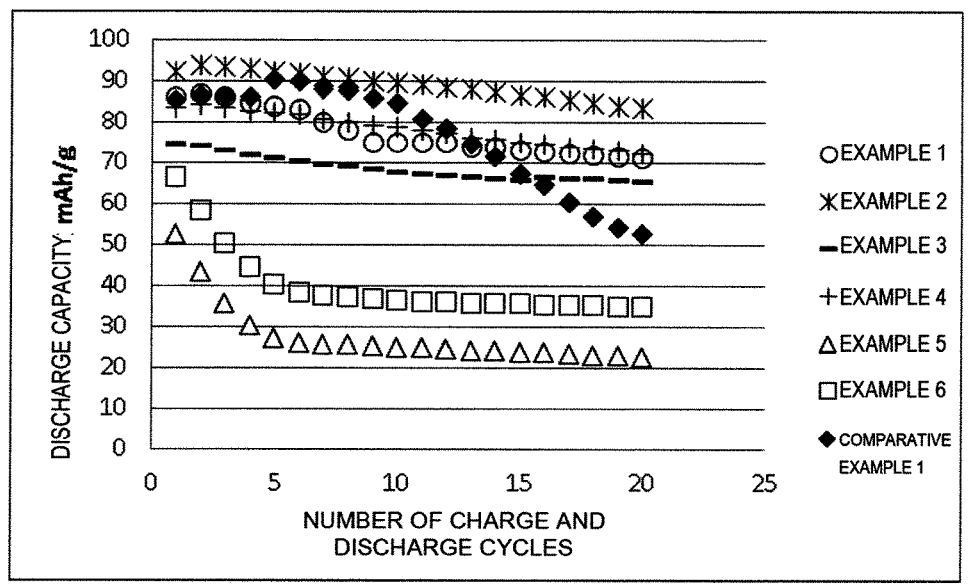

SOLID-STATE BATTERY

TECHNICAL FIELD

The present invention relates to a solid-state battery, particularly, to a solid-state battery in which lithium ions are responsible for electric conduction.

BACKGROUND ART

In recent years, there has been a growing demand for lithium ion secondary batteries in applications such as portable information terminals, portable electronic devices, electric cars, hybrid electric cars, and further stationary electric storage systems. However, existing lithium ion secondary batteries use flammable organic solvents as liquid electrolytes, and require rigid exteriors so as to prevent the leakage of the organic solvents. Further, there are constraints on the structure of devices, such as the need for portable personal computers or the like to have a structure against the risk in the case of leakage of the liquid electrolyte.

Furthermore, the applications extend even to movable vehicles such as automobiles and airplanes, and large capacity is required in stationary lithium ion secondary batteries. Under such a situation, there is a tendency that the safety is considered to be more important than before, and the development of solid-state lithium ion secondary batteries without using toxic materials such as the organic solvents has been focused.

Further, not only high energy density, but also high-speed processing is required in smartphones which have been spread rapidly and widely in recent years. In order to meet such requirements, batteries are desired to have a voltage as high as possible. Accordingly, it is exceptionally important for secondary batteries for small devices to ensure such a voltage.

As a solid electrolyte in solid-state lithium ion secondary batteries, use of oxides, phosphate compounds, organic polymers, sulfides, and the like, has been investigated. However, oxides and phosphate compounds have low resistance to redox, and thus it is difficult for them to stably exist in lithium ion secondary batteries. Further, they also have a disadvantage that, when materials such as metal lithium, low crystalline carbon, and graphite, are used as a negative electrode, the solid electrolyte reacts with the negative electrode (Patent Literature 1).

Further, oxides and phosphate compounds have characteristics that their particles are hard. Accordingly, in order to form a solid electrolyte layer using these materials, sintering at a high temperature of 600° C. or more is generally required, which is time consuming. Furthermore, oxides and phosphate compounds, when used as a material of the solid-electrolyte layer, have a disadvantage that the interfacial resistance with the electrode active material increases. The organic polymers have a disadvantage that the lithium ion conductivity at room temperature is low, and the conductivity drastically decreases when the temperature decreases.

Meanwhile, it is known that sulfides have a high lithium ion conductivity of $1.0 \times 10^{-3}$ S/cm or higher (Patent Literature 2) and $0.2 \times 10^{-3}$ S/cm or higher (Patent Literature 3) at room temperature. Further, their particles are soft, which enables a solid electrolyte layer to be produced by cold pressing, and can easily make its contact interface a good state. However, in the case of using materials containing Ge or Si as a sulfide solid electrolyte material (Patent Literature 2 and Patent Literature 4), these materials have a problem of being susceptible to reduction. Further, there is also the following problem: when batteries are configured using negative-electrode active materials having an electrode potential of about 0 V (with reference to Li electrode) as typified by lithium metals or carbon active materials which are capable of ensuring high voltage in a single cell (Patent Literature 4), the reduction reaction of the sulfide solid electrolyte occurs.

In order to prevent the aforementioned problems, a method of providing a coating on the surface of the negative-electrode active material (Patent Literature 5) and a method of engineering the composition of the solid electrolyte (Patent Literatures 6 to 10), for example, have been proposed. In particular, Patent Literature 10 uses a solid electrolyte containing $P_2S_5$, but a concern for a reaction with the negative-electrode active material remains, even in the case of using such a sulfide solid electrolyte (Non Patent Literature 1). Further, the stability of the negative electrode easily changes due to a slight amount of impurities in the solid-electrolyte layer, and its control is not easy. Under such circumstances, a solid electrolyte capable of forming a good interface with an adjacent material while having high lithium ion conductivity without adversely affecting the stability of the electrode active material has been desired.

As to new lithium-ion-conducting solid electrolytes, it was reported in 2007 that the high temperature phase of $LiBH_4$ had high lithium ion conductivity (Non Patent Literature 2), and it was reported in 2009 that a solid solution obtained by adding LiI to $LiBH_4$ could maintain the high temperature phase at room temperature (Non Patent Literature 3 and Patent Literature 11; hereinafter, for example, an ion conductor containing a complex hydride such as $LiBH_4$ will be referred to also as a complex hydride solid electrolyte). Configurations of batteries using such a complex hydride solid electrolyte have been studied, and it is disclosed that they exert effects particularly in the case of using metal lithium as a negative electrode (Patent Literature 12 and Patent Literature 13).

However, the solid electrolyte containing $LiBH_4$ has a disadvantage of reducing oxides that are generally used as a positive-electrode active material such as $LiCoO_2$. As a technique for preventing this, it was reported that charge/discharge cycles at 120° C. could be achieved by coating a 100-nm $LiCoO_2$ layer formed by pulsed laser deposition (PLD) with about 10 nm of $Li_3PO_4$ (Non Patent Literature 4). However, this technique is not intended for bulk types, but for thin film batteries manufactured using vapor phase deposition, and therefore there are disadvantages that the capacity per cell cannot be ensured as much as in bulk types, and the productivity is also poor.

Although a method for avoiding the reduction by the complex hydride using a specific positive-electrode active material has been found, available positive-electrode active materials are exceptionally limited (such as polycyclic aromatic hydrocarbons with a polyacene skeletal structure and perovskite fluorides) (Patent Literature 12). Further, these positive-electrode active materials are not oxide positive-electrode active materials that are commonly used for commercially available lithium ion secondary batteries at present. Patent Literature 12 describes that oxide positive-electrode active materials coated with specific ion conductors or carbons are less likely to be reduced, but the data shown in its examples only indicates the reduction action during charge, and thus it does not necessarily describe the effects when charge and discharge are repeated.

Non Patent Literature 4 mentions that the reduction of $LiCoO_2$ by $LiBH_4$ occurs during charge, and FIG. 1 of Non Patent Literature 4 clearly shows that the battery resistance increases by repeating charge/discharge cycles. It can be said from this that there is a demand for effective means capable of not only suppressing the reduction of the positive-electrode active material due to the complex hydride in the short term, but also suppressing the increase in the battery resistance after repetition of charge and discharge.

CITATION LIST

Patent Literature

Patent Literature 1: Japanese Patent Laid-Open No. 2000-223156
Patent Literature 2: International Publication No. WO 2011/118801
Patent Literature 3: Japanese Patent Laid-Open No. 2012-43646
Patent Literature 4: Japanese Patent Laid-Open No. 2006-277997
Patent Literature 5: Japanese Patent Laid-Open No. 2011-150942
Patent Literature 6: Japanese Patent No. 3149524
Patent Literature 7: Japanese Patent No. 3163741
Patent Literature 8: Japanese Patent No. 3343934
Patent Literature 9: Japanese Patent No. 4165536
Patent Literature 10: Japanese Patent Laid-Open No. 2003-68361
Patent Literature 11: Japanese Patent No. 5187703
Patent Literature 12: Japanese Patent Laid-Open No. 2012-209106
Patent Literature 13: Japanese Patent Laid-Open No. 2012-209104

Non Patent Literature

Non Patent Literature 1: SEI Technical Review, September 2005, vol. 167, p. 54-60
Non Patent Literature 2: Applied Physics Letters (2007) 91, p. 224103
Non Patent Literature 3: JOURNAL OF THE AMERICAN CHEMICAL SOCIETY (2009), 131, p. 894-895
Non Patent Literature 4: Journal of Power Sources (2013), 226, p. 61-64

SUMMARY

Technical Problem

The present invention aims to provide a solid-state battery having high ion conductivity and excellent stability.

Solution to Problem

The present invention, for example, is as follows:
[1] A solid-state battery comprising:
a positive-electrode layer; a negative-electrode layer; and a lithium-ion-conducting solid electrolyte layer disposed between the positive-electrode layer and the negative-electrode layer,
wherein either or both of the positive-electrode layer and the solid electrolyte layer contain a sulfide solid electrolyte, either or both of the negative-electrode layer and the solid electrolyte layer contain a complex hydride solid electrolyte, and
at least part of the sulfide solid electrolyte is in contact with at least part of the complex hydride solid electrolyte;

[2] The solid-state battery according to [1], wherein the solid electrolyte layer comprises a first solid electrolyte layer on the positive electrode side, the first solid electrolyte layer containing a sulfide solid electrolyte and a second solid electrolyte layer on the negative electrode side, the second solid electrolyte layer containing a complex hydride solid electrolyte;
[2-1] The solid-state battery according to [2], wherein the positive-electrode layer and the first solid electrolyte layer contain the same sulfide solid electrolyte;
[2-2] The solid-state battery according to [2] or [2-1], wherein the negative-electrode layer and the second solid electrolyte layer contain the same complex hydride solid electrolyte;
[3] The solid-state battery according to [1] or [2], wherein the sulfide solid electrolyte contains at least one material selected from the group consisting of $Li_2S$—$P_2S_5$-based materials, $Li_2S$—$SiS_2$-based materials, and $Li_2S$—$GeS_2$-based materials;
[3-1] The solid-state battery according to [3], wherein the sulfide solid electrolyte contains at least one material selected from the group consisting of $Li_2S$—$P_2S_5$, $Li_2S$—$SiS_2$, $Li_2S$—$GeS_2$, $LiGe_{0.25}P_{0.75}S_4$, $Li_{10}GeP_2S_{12}$, and $Li_2S$—$GeS_2$—$Ga_2S_3$;
[4] The solid-state battery according to any one of [1] to [3], wherein the complex hydride solid electrolyte is $LiBH_4$ or a combination of $LiBH_4$ and an alkali metal compound represented by Formula (1) below:

$$MX \quad (1), \text{wherein}$$

M represents an alkali metal atom selected from the group consisting of a lithium atom, a rubidium atom, and a cesium atom, and X represents a halogen atom or an $NH_2$ group;
[4-1] The solid-state battery according to [4], wherein the complex hydride solid electrolyte has diffraction peaks at at least 2θ=24.0±1.0 deg, 25.6±1.2 deg, 27.3±1.2 deg, 35.4±1.5 deg, and 42.2±2.0 deg in X-ray diffraction (CuKα: λ=1.5405 Å) at less than 115° C.;
[5] The solid-state battery according to [4] or [4-1], wherein the alkali metal compound is selected from the group consisting of a lithium halide, a rubidium halide, a cesium halide, and a lithium amide;
[6] The solid-state battery according to any one of [1] to [5], wherein the negative-electrode active material has an electrode potential of 0 to 0.6 V (with reference to Li electrode);
[7] A solid-state battery comprising:
a positive-electrode layer; a negative-electrode layer; and a lithium-ion-conducting solid electrolyte layer disposed between the positive-electrode layer and the negative-electrode layer,
wherein the positive-electrode layer contains a sulfide solid electrolyte, the negative-electrode layer and the solid electrolyte layer contain a complex hydride solid electrolyte, and
at least part of the sulfide solid electrolyte is in contact with at least part of the complex hydride solid electrolyte; and
[8] A solid-state battery comprising:
a positive-electrode layer; a negative-electrode layer; and a lithium-ion-conducting solid electrolyte layer disposed between the positive-electrode layer and the negative-electrode layer, wherein the positive-electrode layer and the solid electrolyte layer contain a sulfide solid electrolyte, the negative-electrode layer contains a complex hydride solid electrolyte, and at least part of the sulfide solid electrolyte is in contact with at least part of the complex hydride solid electrolyte.

Advantageous Effects of Invention

The present invention can provide a solid-state battery having high ion conductivity and excellent stability.

BRIEF DESCRIPTION OF DRAWINGS

FIG. 1 is a sectional view of a solid-state battery according to a first embodiment of the present invention.

FIG. 2 is a sectional view of a solid-state battery according to a second embodiment of the present invention.

FIG. 3 is a sectional view of a solid-state battery according to a third embodiment of the present invention.

FIG. 4 is a graph showing the transitions in discharge capacity from the 1st cycle to the 20th cycle.

DESCRIPTION OF EMBODIMENTS

Hereinafter, embodiments of the present invention will be described with reference to the drawings. It should be noted that components having the same or a similar function in the drawings are represented by the same reference numeral, and the overlapping description will be omitted. Further, the present invention is not limited to materials, configurations, or the like, described below, and various modifications can be made within the range of the gist of the present invention.

First Embodiment

FIG. 1 is a sectional view of the solid-state battery according to the first embodiment of the present invention.

A solid-state battery 10 is, for example, a solid-state lithium ion secondary battery, and can be used in various devices including mobile phones, personal computers, automobiles, and the like. The solid-state battery 10 has a structure in which a solid electrolyte layer 2 is disposed between a positive-electrode layer 1 and a negative-electrode layer 3. In the first embodiment, the solid electrolyte layer 2 includes a first solid electrolyte layer 2a on the positive-electrode layer 1 side containing a sulfide solid electrolyte and a second solid electrolyte layer 2b on the negative-electrode layer 3 side containing a complex hydride solid electrolyte, which are in contact with each other.

Hereinafter, each member will be described in detail.

1. Solid-Electrolyte Layer

The solid electrolyte layer 2 is a lithium-ion-conducting layer disposed between the positive-electrode layer 1 and the negative-electrode layer 3. In the first embodiment, the first solid electrolyte layer 2a and the second solid electrolyte layer 2b are in contact with each other, and therefore the structure is such that at least part of the sulfide solid electrolyte and at least part of the complex hydride solid electrolyte that are contained in the respective layers are in contact with each other. Further, the positive-electrode active material in the positive-electrode layer 1 and the sulfide solid electrolyte in the first solid electrolyte layer 2a are located in adjacent layers, and the negative-electrode active material in the negative-electrode layer 3 and the complex hydride solid electrolyte in the second solid electrolyte layer 2b are located in adjacent layers.

According to the above-described configuration, interfacial resistance generated between the respective layers constituting the solid-state battery 10 is lower, and therefore the lithium ion conductivity of the battery as a whole can be improved. Further, according to the above-described configuration, the complex hydride and the positive-electrode active material are not directly in contact with each other, and therefore the complex hydride with high lithium ion conductivity can be used as a solid electrolyte without concerning about the reduction of the positive-electrode active material by the complex hydride. Since an increase in battery resistance due to the reduction of the active material and the solid electrolyte also can be prevented, a solid-state battery that stably operates over a long period of time, even if charge/discharge cycles are repeated, can be provided.

The sulfide solid electrolyte contained in the first solid electrolyte layer 2a is not specifically limited as long as it is a material having lithium ion conductivity and containing a sulfur atom. Since sulfide solid electrolytes generally have high lithium ion conductivity and are as soft as complex hydride solid electrolytes, it can be molded by pressing. As a sulfide solid electrolyte, $Li_2S$—$P_2S_5$-based materials, $Li_2S$—$SiS_2$-based materials, and $Li_2S$—$GeS_2$-based materials, for example, can be used. More specifically, examples thereof can include $Li_2S$—$P_2S_5$, $Li_2S$—$SiS_2$, $Li_2S$—$GeS_2$, $LiGe_{0.25}P_{0.75}S_4$, $Li_{10}GeP_2S_{12}$, and $Li_2S$—$GeS_2$—$Ga_2S_3$. It should be noted that the expression $Li_2S$—$P_2S_5$ means a solid electrolyte prepared using $Li_2S$ and $P_2S_5$ as raw materials. The composition thereof is not specifically limited, but is preferably, for example, in the range of $Li_2S:P_2S_5=70:30$ to 80:20 in a molar ratio, in the case of $Li_2S$—$P_2S_5$. The same applies also to $Li_2S$—$SiS_2$, $Li_2S$—$GeS_2$, and $Li_2S$—$GeS_2$—$Ga_2S_3$, and there is no limitation to a specific composition ratio.

The sulfide solid electrolyte may be amorphous, or may be crystalline. A crystalline sulfide solid electrolyte can be obtained, for example, by heating an amorphous sulfide solid electrolyte. Further, one of the sulfide solid electrolytes as described above may be used alone, or two or more of them may be used in combination.

The complex hydride solid electrolyte contained in the second solid electrolyte layer 2b is not specifically limited as long as it is a material containing a lithium-ion-conducting complex hydride. For example, the complex hydride solid electrolyte is $LiBH_4$ or a combination of $LiBH_4$ and an alkali metal compound represented by Formula (1) below:

MX        (1), wherein

M represents an alkali metal atom selected from the group consisting of a lithium atom, a rubidium atom, and a cesium atom, and X represents a halogen atom or an $NH_2$ group.

The halogen atom serving as X in Formula (1) above, for example, may be an iodine atom, a bromine atom, a fluorine atom, or a chlorine atom. X is preferably an iodine atom, a bromine atom, or an $NH_2$ group, more preferably an iodine atom or an $NH_2$ group.

Specifically, the alkali metal compound is preferably a lithium halide (for example, LiI, LiBr, LiF, or LiCl), a rubidium halide (for example, RbI, RbBr, RbF, or RbCl), a cesium halide (for example, CsI, CsBr, CsF, or CsCl), or a lithium amide ($LiNH_2$), more preferably LiI, RbI, CsI, or $LiNH_2$. As the alkali metal compound, one of these may be used singly, or two or more of these may be used in combination. Preferable combinations include the combination of LiI and RbI.

Known compounds can be used respectively as $LiBH_4$ and the alkali metal compound. Further, the purity of these compounds is preferably 80% or more, more preferably 90% or more. This is because compounds having a purity within the aforementioned range have high performance as a solid electrolyte.

The molar ratio of $LiBH_4$ to the alkali metal compound is preferably 1:1 to 20:1, more preferably 2:1 to 7:1. When the molar ratio falls within the aforementioned range, the amount of $LiBH_4$ in the solid electrolyte can be sufficiently ensured, and high ion conductivity can be obtained. On the other hand, when the amount of $LiBH_4$ is excessively large, the transition temperature of the high temperature phase (high ion conducting phase) is less likely to decrease, and thus there is a tendency that sufficient ion conductivity cannot be obtained at a temperature lower than the transition temperature of the high temperature phase of $LiBH_4$ (115° C.).

In the case of using two or more types of alkali metal compounds in combination, the mixing ratio thereof is not specifically limited. For example, in the case of using LiI and another alkali metal compound (preferably RbI or CsI) in combination, the molar ratio of LiI to the other alkali metal compound is preferably 1:1 to 20:1, more preferably 5:1 to 20:1. When the molar ratio falls within the aforementioned range, the amount of LiI in the solid electrolyte can be sufficiently ensured, and a solid electrolyte layer having good thermostability can be obtained. On the other hand, when the amount of LiI is excessively large, there is a tendency that the effect of adding the other alkali metal compound cannot be sufficiently obtained, as a result of which sufficient ion conductivity cannot be obtained.

The complex hydride solid electrolyte may has diffraction peaks at at least $2\theta=24.0\pm1.0$ deg, $25.6\pm1.2$ deg, $27.3\pm1.2$ deg, $35.4\pm1.5$ deg, and $42.2\pm2.0$ deg in X-ray diffraction (CuKα: $\lambda=1.5405$ Å) at less than 115° C. It has diffraction peaks preferably at at least $2\theta=23.7\pm0.7$ deg, $25.2\pm0.8$ deg, $26.9\pm0.8$ deg, $35.0\pm1.0$ deg, and $41.3\pm1.0$ deg, more preferably at at least $2\theta=23.6\pm0.5$ deg, $24.9\pm0.5$ deg, $26.7\pm0.5$ deg, $34.6\pm0.5$ deg, and $40.9\pm0.5$ deg. Further, it has diffraction peaks more preferably at at least $2\theta=23.6\pm0.3$ deg, $24.9\pm0.3$ deg, $26.7\pm0.3$ deg, $34.6\pm0.3$ deg, and $40.9\pm0.3$ deg. These diffraction peaks in the five regions correspond to the diffraction peaks of the high temperature phase of $LiBH_4$. The solid electrolyte having diffraction peaks in the five regions, as described above, even at a temperature lower than the transition temperature of the high temperature phase of $LiBH_4$ tends to exhibit high ion conductivity even at a temperature lower than the aforementioned transition temperature.

The method for manufacturing the solid electrolyte to be contained in the first solid electrolyte layer $2a$ and the second solid electrolyte layer $2b$ is not specifically limited, but manufacturing, for example, by mechanical milling or melt mixing disclosed in Japanese Patent No. 5187703 is preferable. The first solid electrolyte layer $2a$ and the second solid electrolyte layer $2b$ may contain materials other than above, as needed. For example, a solid electrolyte layer formed into a sheet using a binder also can be used.

The thickness of the first solid electrolyte layer $2a$ is preferably smaller. Specifically, it is preferably in the range of 0.01 to 1000 µm, more preferably in the range of 0.1 to 500 µm. Further, the thickness of the second solid electrolyte layer $2b$ is also preferably smaller. Specifically, the thickness is preferably in the range of 0.05 to 1000 µm, more preferably in the range of 0.1 µm to 200 µm.

2. Positive-Electrode Layer

The positive-electrode layer 1 is a layer containing at least a positive-electrode active material. The positive-electrode layer 1 may optionally contain a solid electrolyte, a conductive additive, a binder, and the like.

Any material capable of releasing lithium ions during charge and absorbing lithium ions during discharge can be used as the positive-electrode active material. Examples thereof can include transition-metal oxides, sulfur-based positive-electrode active materials, organic positive-electrode active materials, and $FeF_3$ and $VF_3$ obtained using conversion reactions.

As the transition-metal oxides, particles or a thin film of a metal oxide containing at least one of Mn, Co, Ni, Fe, Cr, and V, which are transition metals, and lithium can be used. Specifically, examples thereof include $\alpha\text{-}Fe_2O_3$, $LiCoO_2$, $LiCo_2O_4$, $LiMnO_2$, $LiMn_2O_4$, $Li_2Mn_2O_4$, $LiMnCoO_4$, $Li_2MnCoO_4$, $LiNi_{0.8}Co_{0.15}Al_{0.05}O_2$, $LiNi_{0.5}Mn_{0.5}O_2$, $Li_2NiMn_3O_8$, $LiVO_2$, $V_2O_3$, $LiV_3O_3$, $LiCrO_2$, $LiFePO_4$, $LiCoPO_4$, $LiMnPO_4$, $LiVOPO_4$, $LiNiO_2$, $LiNi_2O_4$, $LiNi_{1/3}Co_{1/3}Mn_{1/3}O_2$, $Li_2FeSiO_4$, $Li_2MnSiO_4$, and $LiFeBO_3$. Above all, $LiCoO_2$, $LiMnO_2$, $LiMn_2O_4$, $Li_2Mn_2O_4$, $LiNi_{0.8}Co_{0.15}Al_{0.05}O_2$, $LiNi_{0.5}Mn_{0.5}O_2$, $Li_2NiMn_3O_8$, $LiFePO_4$, $LiCoPO_4$, $LiMnPO_4$, $LiVOPO_4$, $LiNiO_2$, and $LiNi_{1/3}Co_{1/3}Mn_{1/3}O_2$ are preferable.

Examples of the sulfur-based positive-electrode active materials can include S, $TiS_2$, $TiS_3$, $TiS_4$, NiS, $NiS_2$, CuS, $FeS_2$, $Li_2S$, $MoS_3$, sulfur-polyacrylonitriles, rubeanic acid (dithiooxamide), and disulfide compounds. Above all, $TiS_2$, $TiS_3$, $TiS_4$, NiS, $NiS_2$, $FeS_2$, $Li_2S$, $MoS_3$, sulfur-polyacrylonitriles, and rubeanic acid (dithiooxamide) are preferable.

Examples of the organic positive-electrode active materials can include radical compounds typified by 2,2,6,6-tetramethylpiperidinoxyl-4-yl methacrylate and polytetramethylpiperidinoxy vinyl ether, quinone compounds, radialene compounds, tetracyanoquinodimethan, and phenazine oxide. Above all, radical compounds and quinone compounds are preferable because they have high theoretical capacity and are capable of maintaining relatively good discharge capacity.

The solid electrolyte to be used for the positive-electrode layer 1 is not specifically limited as long as it has lithium ion conductivity and is stable with the positive-electrode active material, but examples thereof include oxide solid electrolytes, phosphate compound solid electrolytes, sulfide solid electrolytes, and oxysulfide solid electrolytes that are mixtures of above, in which sulfide solid electrolytes are preferable. In particular, it is preferable that the same sulfide solid electrolyte be contained in the positive-electrode layer 1 and the first solid electrolyte layer $2a$. This is because, if layers containing solid electrolytes with different compositions are in contact with each other, it is highly possible that constituent elements of the solid electrolytes diffuse in the respective layers, which may result in a decrease in lithium ion conductivity. Since the sulfide solid electrolyte is comparatively soft, it can form a good interface even with a transition metal oxide positive-electrode active material that is hard. The positive-electrode layer 1 is preferably of bulk type containing both a positive-electrode active material and a solid electrolyte.

Examples of the oxide solid electrolytes and the phosphate compound solid electrolytes can include $La_{0.51}Li_{0.34}TiO_{2.94}$, $Li_{1.3}Al_{0.3}Ti_{1.7}(PO_4)_3$, $Li_7La_3Zr_2O_{12}$, $Li_{2.9}PO_{3.3}N_{0.46}$, $Li_{3.6}Si_{0.6}P_{0.4}O_4$, and $Li_{1.5}Al_{0.5}Ge_{1.5}(PO_4)_3$, where $La_{0.51}Li_{0.34}TiO_{2.94}$, $Li_{1.3}Al_{0.3}Ti_{1.7}(PO_4)_3$, and $Li_7La_3Zr_2O_{12}$ are preferable. As the sulfide solid electrolytes, the sulfide solid electrolytes described above for the first solid electrolyte layer 2a can be used. In particular, it is preferable that the same sulfide solid electrolyte be contained in the positive-electrode layer 1 and the first solid electrolyte layer 2a. This is because, if layers containing solid electrolytes with different compositions are in contact with each other, it is highly possible that constituent elements of the solid electrolytes diffuse in the respective layers, which may result in a decrease in lithium ion conductivity.

The ratio of the positive-electrode active material to the solid electrolyte in the positive-electrode layer 1 is favorably higher within the range in which the shape of the positive electrode can be maintained, and necessary ion conductivity can be ensured. For example, the ratio is preferably in the range of positive-electrode active material: solid electrolyte=9:1 to 2:8, more preferably 8:2 to 4:6, in a weight ratio.

The conductive additive to be used for the positive-electrode layer 1 is not specifically limited as long as it has a desired conductivity, but examples thereof can include a conductive additive made of a carbon material. Specific examples thereof include carbon black, acetylene black, Ketjen black, and carbon fibers.

The content of the conductive additive in the positive-electrode layer 1 is preferably lower within the range that allows a desired electron conductivity to be ensured. The content of the conductive additive with respect to the positive-electrode layer forming materials is, for example, 0.1 mass % to 40 mass %, preferably 3 mass % to 30 mass %.

As the binder to be used for the positive-electrode layer 1, binders commonly used for positive electrodes of lithium secondary batteries can be used. For example, polysiloxane, polyalkylene glycol, polyvinylidene fluoride (PVdF), polytetrafluoroethylene (PTFE), and ethylene-vinyl alcohol copolymer (EVOH) can be used. A thickener such as carboxymethylcellulose (CMC) also can be used, as needed.

In order to improve the interfacial state of the positive-electrode active material with the solid electrolyte, the conductive additive, or the current collector, a coating layer can be provided on particles or a thin film of the positive-electrode active material. Specific methods thereof include the methods disclosed in the following patent literatures. For example, as a coating layer that is effective for the case of using a sulfide solid electrolyte, Japanese Patent Laid-Open No. 2012-054151 uses $LiNbO_3$ for controlling a depletion layer generated at the interface between different ion conductors. Further, Japanese Patent Laid-Open No. 2011-159639 discloses that the interfacial resistance is reduced by providing a coating layer of $LiNbO_3$ or $Li_4Ti_5O_{12}$ on the positive-electrode active material. Further, Japanese Patent Laid-Open No. 2008-103280 discloses that the rate characteristics are improved by coating the positive electrode. Examples of the coating material include titanium acid spinel, tantalum oxides, and niobium oxides, and specific examples thereof include $Li_4Ti_5O_{12}$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, and $LiBO_2$.

Further, in the case of using an active material having an olivine structure typified by $LiFePO_4$ and $LiCoPO_4$ having low electron conductivity, the active material can be coated with carbon for smoothing the charge-transfer reaction, and this technique is effective also for the present invention.

The thickness of the positive-electrode layer 1 is not specifically limited as long as the function as a positive-electrode layer is exerted, but is preferably 0.05 μm to 1000 μm, more preferably 0.1 μm to 200 μm.

3. Negative-Electrode Layer

The negative-electrode layer 3 is a layer containing at least a negative-electrode active material, and may optionally contain a solid electrolyte, a conductive additive, a binder, and the like.

As the negative-electrode active material, a metal active material, a carbon active material, and the like, for example, can be used. Examples of the aforementioned metal active material include Li, In, Al, Si, and Sn. Meanwhile, examples of the aforementioned carbon active material include mesocarbon microbead (MCMB), highly oriented pyrolytic graphite (HOPG), hard carbon, and soft carbon.

Use of a material having a lower electrode potential as the negative-electrode active material is preferable. This is because the use of such an active material improves the energy density of the battery, and enhances the operating voltage of the battery. For example, use of a negative-electrode active material having an electrode potential equal to or lower than the electrode potential of Li—In alloy (about 0.62 V; with reference to Li electrode) is preferable. The electrode potential of the negative-electrode active material (with reference to Li electrode) is more preferably 0 to 0.6 V, further preferably 0 to 0.5 V, particularly preferably 0 to 0.3 V. Examples of such a negative-electrode active material include Li, carbon active materials, and Si. Generally, when a battery is configured using a negative-electrode active material having an electrode potential of about 0 V (with reference to Li electrode) such as lithium metals or carbon active materials, the reduction reaction of the sulfide solid electrolyte is concerned. However, according to this embodiment, the negative-electrode active material is not in contact with the sulfide solid electrolyte, and therefore the reduction reaction of the sulfide solid electrolyte by the negative-electrode active material does not occur. Accordingly, the negative-electrode active material having an electrode potential of about 0 V can be used without problems, and the battery can operate stably over a long period of time.

The solid electrolyte to be used for the negative-electrode layer 3 is not specifically limited as long as it has lithium ion conductivity and is stable with the negative-electrode active material, but a complex hydride solid electrolyte, for example, can be used. The complex hydride solid electrolyte is comparatively soft, and therefore can form a good interface with the negative-electrode active material such as graphite. The negative-electrode layer 3 is preferably of bulk type containing both the negative-electrode active material and the solid electrolyte. As the complex hydride solid electrolyte to be contained in the negative-electrode layer 3, the complex hydride solid electrolyte described above for the second solid electrolyte layer 2b can be used. In particular, it is preferable that the same complex hydride solid electrolyte be contained in the negative-electrode layer 3 and the second solid electrolyte layer 2b. This is because, if layers containing solid electrolytes with different compositions are in contact with each other, it is highly possible that constituent elements of the solid electrolytes diffuse in the respective layers, which may result in a decrease in lithium ion conductivity The ratio of the negative-electrode active material to the solid electrolyte is favorably higher within the range in which the shape of the negative electrode can be maintained, and necessary ion conductivity can be ensured. For example, the ratio is preferably in the range of negative-electrode active material:solid electrolyte=9:1 to 2:8, more preferably 8:2 to 4:6, in a weight ratio.

As the conductive additive to be used for the negative-electrode layer 3, the same conductive additive as that in the positive-electrode layer 1 can be used. The ratio of the conductive additive to the negative-electrode layer forming materials is, for example, 0.1 mass % to 20 mass %, preferably 3 mass % to 15 mass %.

As the binder to be used for the negative-electrode layer 3, binders commonly used for negative electrodes of lithium secondary batteries can be used. Examples thereof include polysiloxane, polyalkylene glycol, polyvinylidene fluoride (PVdF), polytetrafluoroethylene (PTFE), styrene-butadiene rubber (SBR), and polyacrylic acid. A thickener such as carboxymethylcellulose (CMC) also can be used, as needed.

The thickness of the negative-electrode layer 3 is not limited as long as the function as a negative-electrode layer is exerted, but is preferably 0.05 μm to 1000 μm, more preferably 0.1 μm to 200 μm.

Second Embodiment

FIG. 2 is a sectional view of a solid-state battery according to a second embodiment of the present invention.

The solid-state battery 10 according to the second embodiment has a structure in which the second solid electrolyte layer 2b containing a complex hydride solid electrolyte is disposed between the positive-electrode layer 1 and the negative-electrode layer 3. That is, the solid-state battery 10 according to the second embodiment does not include the first solid electrolyte layer 2a in the first embodiment. In the second embodiment, the positive-electrode layer 1 contains at least a positive-electrode active material and a sulfide solid electrolyte. The positive-electrode active material and the sulfide solid electrolyte contained in the positive-electrode layer 1 are as described in the first embodiment. The second solid electrolyte layer 2b and the negative-electrode layer 3 are also as described in the first embodiment.

The second embodiment also has a structure in which at least part of the sulfide solid electrolyte contained in the positive-electrode layer 1 is in contact with at least part of the complex hydride solid electrolyte contained in the second solid electrolyte layer 2b. Further, the positive-electrode active material is in contact with the sulfide solid electrolyte in the positive-electrode layer 1, and the negative-electrode active material in the negative-electrode layer 3 and the complex hydride solid electrolyte in the second solid electrolyte layer 2b are located in adjacent layers. Accordingly, also in the solid-state battery of the second embodiment, as in the first embodiment, an interfacial resistance generated between the respective layers is lawer, and therefore the lithium ion conductivity of the battery as a whole can be improved. Further, since the negative-electrode active material is not in contact with the sulfide solid electrolyte, the reduction of the sulfide solid electrolyte by the negative-electrode active material can be prevented, and the effects thereof are also the same as in the first embodiment.

As described above, in the case where the complex hydride is directly in contact with the positive-electrode active material, the reduction of the positive-electrode active material by the complex hydride is concerned. Although this embodiment employs a structure in which the complex hydride solid electrolyte contained in the second solid electrolyte layer 2b is in contact with a part of the positive-electrode active material contained in the positive-electrode layer 1, an increase in battery resistance due to the reduction of the positive-electrode active material is less likely to be caused. The reason thereof is not clear, but it is considered that the complex hydride solid electrolyte reacts with the sulfide solid electrolyte contained in the positive-electrode layer 1 before the complex hydride solid electrolyte reacts with the positive-electrode active material, and the reactivity of the reacted portion with the positive-electrode active material decreases. Alternatively, the state is thought to be less likely to lead to an increase in battery resistance or a decrease in battery capacity, even if the complex hydride solid electrolyte reacts with the positive-electrode active material. As a result, even if the complex hydride solid electrolyte is in contact with the positive-electrode active material, the complex hydride with high lithium ion conductivity can be used as the solid electrolyte without concerning about the reduction of the positive-electrode active material by the complex hydride. Further, it is estimated that an increase in battery resistance is suppressed as described above, as a result of which a solid-state battery that stably operates over a long period of time, even if charge/discharge cycles are repeated, can be provided.

Third Embodiment

FIG. 3 is a sectional view of a solid-state battery according to the third embodiment of the present invention.

The solid-state battery 10 according to the third embodiment has a structure in which the first solid electrolyte layer 2a containing a sulfide solid electrolyte is disposed between the positive-electrode layer 1 and the negative-electrode layer 3. That is, the solid-state battery 10 according to the third embodiment does not include the second solid electrolyte layer 2b in the first embodiment. In the third embodiment, the negative-electrode layer 3 contains at least a negative-electrode active material and a complex hydride solid electrolyte. The negative-electrode active material and the complex hydride solid electrolyte contained in the negative-electrode layer 3 are as described in the first embodiment. The first solid electrolyte layer 2a and the positive-electrode layer 1 are also as described in the first embodiment.

The third embodiment also has a structure in which at least part of the complex hydride solid electrolyte contained in the negative-electrode layer 3 is in contact with at least part of the sulfide solid electrolyte contained in the first solid electrolyte layer 2a. Further, the negative-electrode active material is in contact with the complex hydride solid electrolyte in the negative-electrode layer 3, and the positive-electrode active material in the positive-electrode layer 1 and the sulfide solid electrolyte in the first solid electrolyte layer 2a are located in adjacent layers. Accordingly, also in the solid-state battery of the third embodiment, as in the first embodiment, an interfacial resistance generated between the respective layers is lawer, and therefore the lithium ion conductivity of the battery as a whole can be improved. Further, since the complex hydride solid electrolyte is not directly in contact with the positive-electrode active material, the reduction of the positive-electrode active material by the complex hydride can be prevented, and the effects thereof are also the same as in the first embodiment.

As described above, in the case where the negative-electrode active material having an electrode potential of about 0 V (with reference to Li electrode) is directly in contact with the sulfide solid electrolyte, the reduction of the sulfide solid electrolyte by the negative-electrode active material is concerned. Although this embodiment employs a structure in which the sulfide solid electrolyte contained in the first solid electrolyte layer 2a is in contact with a part of the negative-electrode active material contained in the negative-electrode layer 3, an increase in battery resistance due to the reduction of the negative-electrode active material is less likely to be caused. The reason thereof is not clear, but it is considered that the sulfide solid electrolyte reacts with the complex hydride solid electrolyte contained in the negative-electrode layer 3 before the sulfide solid electrolyte reacts with the negative-electrode active material, and the reactivity of the reacted portion with the negative-electrode active material decreases. Alternatively, the state is thought to be less likely to lead to an increase in battery resistance or a decrease in battery capacity, even if the sulfide solid electrolyte reacts with the negative-electrode active material. As a result, the negative-electrode active material having an electrode potential of about 0 V (with reference to lithium electrode) can be used without concerning about the reduction of the sulfide solid electrolyte by the negative-electrode active material, and use of such a negative-electrode active material allows a battery with high operating voltage to be obtained. Further, it is estimated that an increase in battery resistance is suppressed as described above, as a result of which a solid-state battery that stably operates over a long period of time, even if charge/discharge cycles are repeated, can be provided.

As described above, the first to third embodiments provide: a solid-state battery comprising:
a positive-electrode layer; a negative-electrode layer; and a lithium-ion-conducting solid electrolyte layer disposed between the positive-electrode layer and the negative-electrode layer,
wherein either or both of the positive-electrode layer and the solid electrolyte layer contain a sulfide solid electrolyte, either or both of the negative-electrode layer and the solid electrolyte layer contain a complex hydride solid electrolyte, and at least part of the sulfide solid electrolyte is in contact with at least part of the complex hydride solid electrolyte.

(Method for Manufacturing Solid-State Battery)

Subsequently, a method for manufacturing the aforementioned solid-state battery will be described.

The solid-state battery is manufactured by forming the aforementioned layers and laminating them, but the formation method and the lamination method of the layers are not specifically limited. Examples thereof include: a method for forming a film by forming a slurry by dispersing a solid electrolyte or an electrode active material in a solvent and applying the slurry by doctor blading, spin coating, or the like, followed by rolling; a vapor phase method in which film forming and lamination are performed by vacuum evaporation, ion plating, sputtering, laser ablation, or the like; and a pressing method in which powder is formed and laminated by hot pressing or cold pressing without heating. Since both the sulfide solid electrolyte and the complex hydride solid electrolyte are soft, it is particularly preferable that a battery be produced by forming and laminating the layers by pressing. Further, the positive-electrode layer can be formed also by the sol-gel method.

EXAMPLES

Hereinafter, the present invention will be described in detail by way of examples, but the contents of the present invention are not limited by these examples.

Example 1

(Preparation of Complex Hydride Solid Electrolyte)

Within a glove box under an argon atmosphere, $LiBH_4$ (with a purity of 90%, manufactured by Sigma-Aldrich Co. LLC.) was mixed in an agate mortar with LiI (with a purity of 99.999%, manufactured by Sigma-Aldrich Co. LLC.) in a molar ratio of $LiBH_4:LiI=3:1$. Next, the mixed starting materials were put into a 45-mL pot made of SUJ-2, and balls made of SUJ-2 (20 balls with a diameter of 7 mm) were further put therein. Then, the pot was completely sealed. This pot was mounted on a planetary ball mill (P7, manufactured by Fritsch Japan Co., Ltd.), and mechanical milling was performed at a rotation rate of 400 rpm for 5 hours, to obtain a complex hydride solid electrolyte ($3LiBH_4$—LiI).

(Preparation of Sulfide Solid Electrolyte)

Within a glove box under an argon atmosphere, $Li_2S$ (with a purity of 99%, manufactured by Sigma-Aldrich Co. LLC.) was mixed in an agate mortar with $P_2S_5$ (with a purity of 99%, manufactured by Sigma-Aldrich Co. LLC.) in a molar ratio of $Li_2S:P_2S_5=8:2$. Next, the mixed starting materials were put into a 45-mL pot made of zirconia, and balls made of zirconia (160 balls with a diameter of 5 mm) were further put therein. Then, the pot was completely sealed. This pot was mounted on a planetary ball mill (P7, manufactured by Fritsch Japan Co., Ltd.), and mechanical milling was performed at a rotation rate of 510 rpm for 12 hours, to obtain a sulfide solid electrolyte ($80Li_2S$-$20P_2S_5$).

(Preparation of Positive-Electrode Layer Powder)

Lithium ethoxide ($LiOC_2H_5$) and niobium pentaethoxide $[Nb(OC_2H_5)_5]$ were dissolved in dehydrated ethanol to give a solution at a solute concentration of 5 wt %. This solution was applied to $LiCoO_2$ (CELLSEED C-5H, manufactured by NIPPON CHEMICAL INDUSTRIAL CO., LTD.) by spray coating using a tumbling fluidized bed granulating-coating machine (MP-01, manufactured by Powrex Corporation). It was sintered at 350° C. for 3 hours in the presence of air, thereby forming a $LiNbO_3$ film with a thickness of about 10 nm on the surface of $LiCoO_2$, to produce a positive-electrode active material. Next, powders were weighed out within a glove box in a weight ratio of positive-electrode active material:sulfide solid electrolyte ($80Li_2S$-$20P_2S_5$):Ketjen black (conductive additive)=40:60:9, and were mixed in a mortar, to give a positive-electrode layer powder.

(Production of Solid-State Battery)

The complex hydride solid electrolyte powder prepared above was put into a 10-mm diameter powder tableting machine, and was press-formed at a pressure of 28 MPa into a disk shape (formation of a second solid electrolyte layer; which may be hereinafter referred to also as complex hydride solid electrolyte layer). Without taking out the formed product, the sulfide solid electrolyte powder prepared above was subsequently put into the tableting machine and was press-formed again at a pressure of 28 MPa (formation of a first solid electrolyte layer; which may be hereinafter referred to also as sulfide solid electrolyte layer). Further, the positive-electrode layer powder prepared above was put therein, which was integrally formed at a pressure of 240 MPa. Thus, a disk-shaped pellet in which the positive-electrode layer (75 μm), the sulfide solid electrolyte layer (400 μm), and the complex hydride solid electrolyte layer (400 μm) were sequentially laminated was obtained. To the surface of the pellet opposite to the positive-electrode layer, a metal lithium foil with a thickness of 200 μm and a diameter of 10 mm was attached, and the pellet was put into a battery test cell made of SUS304 to form a solid-state secondary battery (Charge-Discharge Test)

The thus produced solid-state battery was subjected to charge and discharge at a constant current under conditions of a measurement temperature of 25° C., a cut-off voltage of 3.2 to 4.2 V, and a current density of 0.064 mA/cm² (50.3 μA), using a potentiostat/galvanostat (VMP3, manufactured by Bio-Logic Science Instruments). It should be noted that a pause for 3 minutes was provided after each of charge and discharge.

Example 2

A solid-state battery was produced in the same manner as in Example 1, except that the sulfide solid electrolyte layer was not provided, and the thickness of the complex hydride solid electrolyte layer was changed to 800 μm. The charge-discharge test was performed also in the same manner as in Example 1.

Example 3

The same materials as in Example 1 were used for the complex hydride solid electrolyte layer, the sulfide solid electrolyte layer, and the positive-electrode layer.
(Production of Solid-State Battery)
The complex hydride solid electrolyte powder was put into a 10-mm diameter powder tableting machine and was press-formed at a pressure of 28 MPa into a disk shape (formation of a complex hydride solid electrolyte layer). Without taking out the formed product, the sulfide solid electrolyte powder was subsequently put into the tableting machine, and was press-formed again at a pressure of 28 MPa (formation of a sulfide solid electrolyte layer). To the complex hydride solid electrolyte layer side of this pellet, an indium foil with a thickness of 100 μm and a diameter of 8 mm was attached, and the positive-electrode layer powder was put on the other side thereof, which was integrally formed at a pressure of 240 MPa. Thus, a disk-shaped pellet in which the positive-electrode layer (75 μm), the sulfide solid electrolyte layer (400 μm), the complex hydride solid electrolyte layer (400 μm), and the negative-electrode layer (70 μm) (in which the indium foil was spread to a diameter of 9 mm) were sequentially laminated was obtained. The pellet was put into a battery test cell made of SUS304, to produce a solid-state secondary battery. It should be noted that, upon starting the charge of the battery, Li—In alloy is instantaneously formed from the indium foil.
(Charge-Discharge Test)
The charge-discharge test was performed in the same manner as in Example 1, except that the cut-off voltage was changed to 2.0 to 3.6 V (2.62 to 4.22 V with reference to Li electrode).

Example 4

A solid-state battery was produced in the same manner as in Example 3, except that the sulfide solid electrolyte layer was not provided, and the thickness of the complex hydride solid electrolyte layer was changed to 800 μm. The charge-discharge test was performed in the same manner as in Example 1.

Example 5

The same materials as in Example 1 were used for the complex hydride solid electrolyte layer, the sulfide solid electrolyte layer, and the positive-electrode layer.
(Preparation of Negative-Electrode Layer Powder)
Powders were weighed out within a glove box in a weight ratio of graphite (CGB-10, manufactured by Nippon Graphite Industries, Co., Ltd.):complex hydride solid electrolyte ($3LiBH_4$—LiI):Ketjen black (conductive additive)=27:64:9, and were mixed in a mortar, to give a negative-electrode layer powder.
(Production of Solid-State Battery)
The negative-electrode layer powder prepared above was put into a 10-mm diameter powder tableting machine and was press-formed at a pressure of 28 MPa into a disk shape (formation of a negative-electrode layer). Without taking out the formed product, the complex hydride solid electrolyte was subsequently put into the tableting machine, and was press-formed again at a pressure of 28 MPa (formation of a complex hydride solid electrolyte layer). Next, the sulfide solid electrolyte was put into the tableting machine, and was press-formed at a pressure of 28 MPa (formation of a sulfide solid electrolyte layer). Further, the positive-electrode layer powder was put therein, which was integrally formed at a pressure of 240 MPa. Thus, a disk-shaped pellet in which the positive-electrode layer (75 μm), the sulfide solid electrolyte layer (400 μm), the complex hydride solid electrolyte layer (400 μm), and the negative-electrode layer (75 μm) were sequentially laminated was obtained. The pellet was put into a battery test cell made of SUS304, to produce a solid-state secondary battery.
(Charge-Discharge Test)
The charge-discharge test was performed in the same manner as in Example 1, except that the cut-off voltage was changed to 3.1 to 4.1 V (3.2 to 4.2 V with reference to Li).

Example 6

A solid-state battery was produced in the same manner as in Example 5, except that the complex hydride solid electrolyte layer was not provided, and the thickness of the sulfide solid electrolyte layer was changed to 800 μm. The charge-discharge test was performed in the same manner as in Example 1.

Comparative Example 1

A solid-state battery was produced in the same manner as in Example 1, except that the complex hydride solid electrolyte layer was not provided, and the thickness of the sulfide solid electrolyte layer was changed to 800 μm. The charge-discharge test was performed also in the same manner as in Example 1.

Comparative Example 2

A solid-state battery was produced in the same manner as in Example 2, except that the positive-electrode active material was changed to $LiCoO_2$ (CELLSEED C-5H, manufactured by NIPPON CHEMICAL INDUSTRIAL CO., LTD., without $LiNbO_3$ coating), and the solid electrolyte used for the "positive-electrode layer powder" was changed to a complex hydride ($3LiBH_4$—LiI). The charge-discharge test was performed in the same manner as in Example 1.

Comparative Example 3

A solid-state battery was produced in the same manner as in Example 2, except that the solid electrolyte contained in the positive-electrode layer and the complex hydride solid electrolyte contained in the solid electrolyte layer were changed to $LiBH_4$. The charge-discharge test was performed in the same manner as in Example 1, except that the test temperature was changed to 120° C.

Comparative Example 4

A solid-state battery was produced in the same manner as in Example 2, except that the positive-electrode active material was changed to LiFePO$_4$ (SLFP-ES01) coated with carbon, and the solid electrolyte contained in the positive-electrode layer was changed to a complex hydride (3LiBH$_4$—LiI). The charge-discharge test was performed in the same manner as in Example 1, except that the cut-off voltage was changed to 2.5 to 3.8 V.

The battery configurations of Examples 1 to 6 and Comparative Examples 1 to 4 described above are collectively shown in Table 1 below. Further, the transitions in discharge capacity from the 1st cycle to the 20th cycle are shown in FIG. 4. Further, the discharge capacity, the battery resistance, and the coulomb efficiency at the 1st cycle and the 20th cycle are shown in Table 2 below. It should be noted that the discharge capacity was expressed by taking the discharge capacity obtained for the tested battery as a value per gram of the positive-electrode active material. The battery resistance was calculated from the IR drop at 10 seconds after the pause of charge. The coulomb efficiency was calculated from the discharge capacity/the charge capacity.

the solid-state batteries according to the embodiments of the present invention, the resistance is less likely to increase, and accordingly the discharge capacity is less likely to decrease, even if charge/discharge cycles are repeated. Therefore, it can be said that the solid-state batteries according to the embodiments of the present invention are capable of stably operating over a long period of time. Further, the solid-state batteries according to the embodiments of the present invention turned out to have another advantage that the coulomb efficiency is less likely to decrease, even after charge/discharge cycles are repeated.

Further, as mentioned above, the solid-state battery according to the embodiments of the present invention can use the complex hydride with high lithium ion conductivity as a solid electrolyte without concerning about the reduction of the positive electrode active material by the complex hydride. Furthermore, an interfacial resistance generated between the respective layers constituting the solid-state battery is lawer, and therefore the lithium ion conductivity of the battery as a whole also can be improved.

Although some embodiments of the present invention have been described, these embodiments are presented as examples, and the scope of the invention is not intended to be limited thereto. These novel embodiments can be implemented in various other forms, and various omissions,

TABLE 1

Battery configuration

| | Positive-electrode layer | First solid-electrolyte layer | Second solid-electrolyte layer | Negative-electrode layer |
|---|---|---|---|---|
| Example 1 | LiCoO$_2$, 80Li$_2$S—20P$_2$S$_5$ | 80Li$_2$S—20P$_2$S$_5$ | 3LiBH$_4$—LiI | Lithium foil |
| Example 2 | LiCoO$_2$, 80Li$_2$S—20P$_2$S$_5$ | None | 3LiBH$_4$—LiI | Lithium foil |
| Example 3 | LiCoO$_2$, 80Li$_2$S—20P$_2$S$_5$ | 80Li$_2$S—20P$_2$S$_5$ | 3LiBH$_4$—LiI | Indium foil |
| Example 4 | LiCoO$_2$, 80Li$_2$S—20P$_2$S$_5$ | None | 3LiBH$_4$—LiI | Indium foil |
| Example 5 | LiCoO$_2$, 80Li$_2$S—20P$_2$S$_5$ | 80Li$_2$S—20P$_2$S$_5$ | 3LiBH$_4$—LiI | Graphite, 3LiBH$_4$—LiI |
| Example 6 | LiCoO$_2$, 80Li$_2$S—20P$_2$S$_5$ | 80Li$_2$S—20P$_2$S$_5$ | None | Graphite, 3LiBH$_4$—LiI |
| Comparative Example 1 | LiCoO$_2$, 80Li$_2$S—20P$_2$S$_5$ | 80Li$_2$S—20P$_2$S$_5$ | None | Lithium foil |
| Comparative Example 2 | LiCoO$_2$, 3LiBH$_4$—LiI | None | 3LiBH$_4$—LiI | Lithium foil |
| Comparative Example 3 | LiCoO$_2$, LiBH$_4$ | None | LiBH$_4$ | Lithium foil |
| Comparative Example 4 | LiFePO$_4$, 3LiBH$_4$—LiI | None | 3LiBH$_4$—LiI | Lithium foil |

TABLE 2

Test results

| | Battery resistance | | | Coulomb efficiency | | Discharge capacity | |
|---|---|---|---|---|---|---|---|
| | 1st cycle (Ω) | 20th cycle (Ω) | Increased resistance (Ω) | 1st cycle (%) | 20th cycle (%) | 1st cycle (mAh/g) | 20th cycle (mAh/g) |
| Example 1 | 2065 | 2123 | 58 | 77.1 | 99.9 | 86 | 76 |
| Example 2 | 1946 | 2263 | 317 | 74.6 | 99.6 | 92 | 83 |
| Example 3 | 1463 | 1672 | 209 | 75.8 | 99.9 | 74 | 65 |
| Example 4 | 1003 | 1136 | 133 | 74.6 | 99.8 | 84 | 72 |
| Example 5 | 2839 | 2994 | 155 | 42.5 | 97.1 | 53 | 23 |
| Example 6 | 1435 | 1350 | −85 | 49.5 | 98.1 | 67 | 35 |
| Comparative Example 1 | 770 | 1996 | 1226 | 77.8 | 28.5 | 85 | 53 |
| Comparative Example 2 | No discharge capacity obtained | | | | | | |
| Comparative Example 3 | No discharge capacity obtained | | | | | | |
| Comparative Example 4 | No discharge capacity obtained | | | | | | |

For Comparative Examples 2 to 4, no discharge capacity was obtained, and the function as a battery was not exerted. It can be seen from the aforementioned test results that, in replacements, and modifications can be made without departing from the gist of the invention. These embodiments and modifications thereof are included in the scope or gist of

REFERENCE SIGNS LIST

1: Positive-electrode layer, 2: Solid-electrolyte layer, 2a: First solid-electrolyte layer, 2b: Second solid-electrolyte layer, 3: Negative-electrode layer

The invention claimed is:

1. A solid-state battery comprising:
a positive-electrode layer;
a negative-electrode layer; and
a lithium-ion-conducting solid electrolyte layer disposed between the positive-electrode layer and the negative-electrode layer, wherein
the positive-electrode layer contains a sulfide solid electrolyte,
either or both of the negative-electrode layer and the solid electrolyte layer contain a complex hydride solid electrolyte,
at least part of the sulfide solid electrolyte is in contact with at least part of the complex hydride solid electrolyte; and
the positive-electrode layer does not contain the complex hydride solid electrolyte.

2. The solid-state battery according to claim 1, wherein the solid electrolyte layer comprises:
a first solid electrolyte layer on the positive electrode side, the first solid electrolyte layer containing a sulfide solid electrolyte; and
a second solid electrolyte layer on the negative electrode side, the second solid electrolyte layer containing a complex hydride solid electrolyte.

3. The solid-state battery according to claim 1, wherein the sulfide solid electrolyte contains at least one material selected from the group consisting of $Li_2S$—$P_2S_5$-based materials, $Li_2S$—$SiS_2$-based materials, and $Li_2S$—$GeS_2$-based materials.

4. The solid-state battery according to claim 1, wherein the complex hydride solid electrolyte is $LiBH_4$ or a combination of $LiBH_4$ and an alkali metal compound represented by Formula (1) below:

$$MX \qquad (1),$$

wherein M represents an alkali metal atom selected from the group consisting of a lithium atom, a rubidium atom, and a cesium atom, and X represents a halogen atom or an $NH_2$ group.

5. The solid-state battery according to claim 4, wherein the alkali metal compound is selected from the group consisting of a lithium halide, a rubidium halide, a cesium halide, and a lithium amide.

6. The solid-state battery according to claim 1, wherein the negative-electrode layer contains a complex hydride solid electrolyte.

* * * * *